United States Patent [19]

Old et al.

[11] 3,938,579
[45] Feb. 17, 1976

[54] METHOD OF PRODUCING COMPOSITE BEARING MATERIALS

[75] Inventors: Charles Fraser Old; Michael George Nicholas, both of Wantage, England; Brian Wilfred Howlett, deceased, late of Newbury, England, by Margaret Howlett, administratrix

[73] Assignee: United Kingdom Atomic Energy Authority, London, England

[22] Filed: Sept. 10, 1971

[21] Appl. No.: 179,341

[30] Foreign Application Priority Data
Sept. 10, 1970 United Kingdom............... 43459/70

[52] U.S. Cl.................................... 164/87; 164/100
[51] Int. Cl.².......................................... B22D 11/00
[58] Field of Search ......... 164/86, 100, 75, 87, 276, 164/57, 275; 29/191, 195 C, 419 R, 419 G, 527.5, 527.7; 252/12.2, 12.4, 12.6

[56] References Cited
UNITED STATES PATENTS

| | | | |
|---|---|---|---|
| 3,337,337 | 8/1967 | Weeton et al. | 29/419 |
| 3,509,937 | 5/1970 | Radd | 164/87 |
| 3,571,901 | 3/1971 | Sara | 29/419 |
| 3,622,283 | 11/1971 | Sara | 29/195 C |
| 3,623,981 | 11/1971 | Giltrow | 29/195 C |
| 3,674,689 | 7/1972 | Giltrow et al. | 252/12.4 |
| 3,710,844 | 1/1973 | Doi et al. | 164/75 |
| 3,720,257 | 3/1973 | Beutler et al. | 164/75 |

*Primary Examiner*—Al Lawrence Smith
*Assistant Examiner*—Robert C. Watson
*Attorney, Agent, or Firm*—Larson, Taylor & Hinds

[57] ABSTRACT

Bearings including a layer of a bearing metal, e.g. a lead/tin alloy, in which continuous or discontinuous carbon fibres are incorporated and are concentrated at or near the bearing surface. The proportion of carbon fibres at or near the bearing surface is from 2 to 60 r/o.

A method of making shell bearings of this type comprises providing a trough of a backing material for the bearing carrying a continuous longitudinal tow of carbon fibres, pouring into the trough a molten bearing metal at a temperature at which it wets the carbon fibres, and cooling and solidifying the bearing metal with the carbon fibres incorporated therein. The carbon fibres may be coated, e.g. with copper, to enable them to be more readily wetted by the molten bearing metal.

8 Claims, 2 Drawing Figures

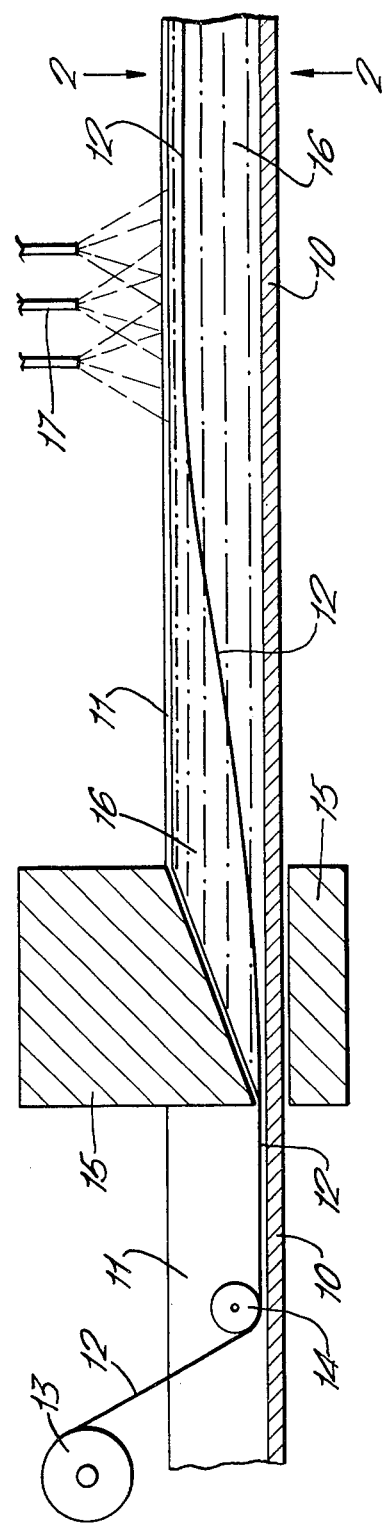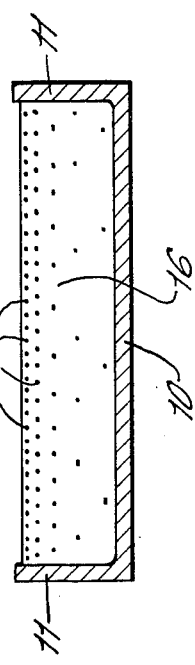

METHOD OF PRODUCING COMPOSITE BEARING MATERIALS

This invention relates to bearings in which carbon fibres are incorporated in or near the bearing surface, and to a method for the continuous manufacture of such bearings. Difficulty arises in incorporating the carbon fibres in the bearing metal at or near the bearing surface, and this is solved, according to the invention, by an infiltration process, in which either the fibres are especially treated to render them wettable by the bearing metal, or special bearing metal alloys are used which are capable of wetting carbon fibres which have not been subjected to this special treatment. An alloy is said to wet carbon fibre if the contact angle between the two is less than 90°.

The incorporation of carbon fibre uniformly in bearing metal is known. We have found that similar improvements may be obtained at reduced cost by incorporating the carbon fibre non-uniformly in the bearing metal layer.

According to one aspect of the present invention, there is provided a bearing, e.g., a solid bearing or a shell bearing, including a layer of a bearing metal in which either continuous or discontinuous carbon fibres are incorporated, preferably but not necessarily parallel to the bearing surface, wherein the carbon fibres in the surface layer of bearing metal are concentrated at or near the bearing surface.

According to another aspect of the present invention, there is provided a shell bearing including a layer of a bearing metal in which continuous carbon fibres are incorporated parallel to, and at a controlled distance from, the bearing surface.

The bearing metals with which the present invention is concerned are soft metals or alloys based on tin, lead or aluminium, which melt preferably within the range of 170° to 200°C. Of particular interest are lead/tin alloys, optionally containing minor proportions of other ingredients.

There are two main types of carbon fibre, known as type I and type II. Type I are high modulus fibres with typical properties U.T.S. 0.25 – 0.3 × $10^6$ psi, and Youngs modulus 56 – 60 × $10^6$ psi. Type II are high strength fibres with typical properties U.T.S. 0.35 – 0.4 × $10^6$ psi, and Youngs modulus ~30 × $10^6$ psi. If one is more interested in improving the strength of bearings than their moduli, it is preferable to work with type II fibres. There is no reason, however, why type I fibre should not be used as an alternative.

The proportion of carbon fibres which are incorporated in the bearing metal may vary from 1 to 75 $^v$/o, preferably from 2 to 60 $^v$/o. Carbon fibres are included to reinforce the bearing metal and, where this is the only object, an appropriate range may be from 2 to 25 $^v$/o, preferably 5 to 12 or 15 $^v$/o. However, in addition to their reinforcing action, the carbon fibres may, if they are present in sufficient quantity, confer desirable lubricating properties if the normal lubricant system should prove inadequate, e.g., during start-up in automobile engines. In order to achieve this further effect, the carbon fibres should be present in the bearing metal in an amount of from 25 to 60 $^v$/o, preferably 35 to 50 $^v$/o. This invention is not concerned with non-lubricated bearings of the kind in which the sole lubrication is intended to be provided by the carbon in the bearing surface.

It will be appreciated that, if the carbon fibres are to exert their maximum effect, they should be uniformly distributed close to the bearing surface but embedded in the bearing metal. One method by which such a distribution can be achieved is described below.

The invention also provides a process for the manufacture of shell bearings, which process comprises providing a trough of a backing material for the bearing carrying a continuous longitudinal tow of carbon fibres, pouring into the trough a molten bearing metal at a temperature at which it wets the carbon fibres, and cooling and solidifying the bearing metal with the carbon fibres incorporated therein.

There follows a more specific description of one embodiment of this process, reference being made to the accompanying drawings, in which:

FIG. 1 is a cross-sectional side elevation of a continuous production line, and

FIG. 2 is a cross-section on the line 2-2 in FIG. 1 of the shell bearing produced.

Both drawings are diagrammatic, the vertical dimension having been expanded for clarity.

Referring to the drawings, a trough of any suitable backing material, e.g. 22 cm. tinned steel strip, having a flat bottom 10 and turned up at the edges at 11, is passed continuously forward (from left to right in FIG. 1) along the production line. Carbon fibre 12 is drawn from a supply 13 and spread by means of a roller 14 across the entire width of the trough 10. The trough passes through a furnace 15 in which molten bearing metal 16 is poured in to the desired depth, e.g. 1 mm. After leaving the furnace 15, the bearing metal 16 is rapidly cooled and solidified by passage through a water quench 17. Finally, the full trough is up and the pieces shaped and machined as necessary into shell bearings.

The carbon fibres, being of lower density than the bearing metal, tend to rise to the surface of the molten metal. It is desirable that the fibres should approach, but should not actually reach, the surface before the system is frozen by solidification of the bearing metal. The following factors affect, and can be varied to control, this rate of rising:

a. the tension applied to the carbon fibre tow, b. the speed of movement of the trough, c. the distance between the point where the molten metal is poured into the trough and the quench, and d. the net density of the carbon fibres (this may be altered if the fibres are coated, as is more fully described below).

These factors are all interdependent, but for fibres plated with ~2–2½$\mu$m of copper, i.e. with an overall density of ~6g/cc, tensions of only 1–10gms. suffice. Suitable trough speeds are ~5m/min, with 50cms separation between the furnace outlet and cooling spray.

For this process to be successful, it is essential that the bearing metal should be poured into the trough at a temperature at which it wets the carbon fibres but does not react rapidly and substantially with them. Conventional lead/tin bearing metals do not, in general, wet untreated carbon fibres at temperatures below those at which rapid and substantial reaction takes place. It is, however, possible to mitigate this difficulty by modifying either the carbon fibres, or the bearing metal, as will now be more fully described.

One method comprises providing the carbon fibres with a coating such that they are wettable by the bearing metal, and incorporating the coated fibres by infiltration into the bearing metal under conditions such that the coated fibres are wetted by the molten bearing metal.

The coating on the carbon fibres will generally be of a metal. It is known that coatings of metals, e.g. copper of nickel, may be provided on carbon fibres by electroplating. It is also possible to provide coatings by vapour phase deposition or other techniques.

When the coated fibres are incorporated in the molten bearing metal, the coating tends to diffuse into the bearing metal. It is desirable that the coating should not diffuse away completely before the bearing metal has solidified, as the bare fibres would no longer be wetted by the bearing metal. On the other hand, the coating is quite expensive, and there is no need to provide it in a thickness greater than that necessary to ensure that the fibres remain incorporated in the bearing metal until it solidifies. We have found electroplated copper coatings of from 0.5 to 5.0 microns thickness, preferably 1 to 2 microns, to be suitable.

The nature of the coating needs to be correlated with the nature of the bearing metal, and with the temperature at which infiltration is effected. Copper coated carbon fibres are wetted by lead, tin and mixtures of the two provided that high enough temperatures are used. But the minimum wetting temperatures for lead/tin alloys are lower than those for the pure metals, and we prefer to use alloys containing from 20 to 80 $^w/o$ of lead and from 80 to 20 $^w/o$ of tin, particularly alloys containing from 30 to 70 $^w/o$ of lead and from 70 to 30 $^w/o$ of tin. It is desirable to effect infiltration at comparatively low temperatures to minimise both the rate of diffusion of the coating from the fibres and also the possibility of reaction between the metal and the carbon fibres. The preferred lead/tin alloys can often be infiltrated at temperataures below 300°C. However, the fibres are most rapidly penetrated at temperatures in the region of 450°C. Above this temperature the copper coating is quickly dissolved off, and substantially below this temperature, the liquid alloy lacks sufficient fluidity to effect good penetration of the fibres.

The contact angles of various lead-tin alloys at various temperatures with copper-coated carbon fibre are set out in the following table:

the composition of said bearing metal being such that it wets uncoated carbon fibres at temperatures below those at which rapid and substantial reaction takes place with the carbon fibres.

The contact angle between a tin —1 $^w/o$ titanium alloy and vitreous carbon is 136° at 700°C. and 68° at 800°C.

The contact angle between a tin — 1 $^w/o$ vanadium alloy and vitreous carbon is 98° at 825°C. and 82° at 925°C.

The contact angle between a tin — 1 $^w/o$ hafnium alloy and vitreous carbon is 100° at 815°C. and 70° at 925°C.

At temperatures of this order, it does appear that wetting is not due to metal carbide formation.

It will be appreciated that these bearing alloys can be used in the process for the manufacture of shell bearings hereinbefore described, with the advantage that the carbon fibres do not have to be specially coated before use. For this purpose we prefer to use tin-based alloys containing from 0.5 to 5.0 $^w/o$ of titanium, vanadium or hafnium.

We claim:

1. A process for the continuous manufacture of carbon fiber reinforced shell bearings which process comprises:
    a. providing a continuous casting furnace and spaced therefrom, a cooling station comprising a water quench;
    b. supplying continuously to said furnace a continuous trough of a backing material;
    c. supplying longitudinally of the internal base of said trough in said furnace continuous carbon fibers in the form of a tow, the fibers of said tow being supplied across the width of said trough;
    d. supplying in said trough in said furnace, molten bearing metal at a temperature at which it wets said carbon fibers, whereby said carbon fibers are incorporated in said molten bearing metal;
    e. passing said trough containing said molten bearing metal and incorporated carbon fibers from said furnace to said cooling station, during which passage the carbon fibers rise through said molten bearing metal to approach the surface of said mol-

| Lead-tin alloy | | | | | | | | |
|---|---|---|---|---|---|---|---|---|
| Sn% | 100 | 80 | 72 | 62 | 50 | 40 | 20 | 0 |
| PB% | 0 | 20 | 28 | 38 | 50 | 60 | 80 | 100 |
| Contact angle | | | | | | | | |
| 20° | — | — | 450 | 280 | 295 | 320 | 470 | — |
| 30° | 365 | 300 | 260 | 265 | 285 | 305 | 435 | 590 |
| 60° | 290 | 250 | 235 | 250 | 275 | 290 | 400 | 540 |
| 90° | 245 | 225 | 220 | 240 | 270 | 285 | 380 | 480 |
| Melting point | 230 | 200 | 190 | 180 | 210 | 230 | 275 | 320 |

Copper-coated carbon fibres are also wetted by aluminium and aluminium/tin alloys at temperatures below 700°C.

Another method of overcoming the wetting difficulty referred to above is to use as a bearing metal either:

a. an alloy based on tin, optionally in admixture with lead, containing a small proportion of titanium, vanadium or hafnium, or b. an alloy based on aluminium containing a small proportion of chromium, ten bearing metal; and f. cooling and solidifying said molten bearing in said cooling station by quenching with water to form the shell bearing product in the form of a continuous strip of bearing metal containing incorporated therein continuous carbon fibers concentrated near the surface of said bearing.

2. A process for the continuous manufacture of carbon fibers reinforced shell bearings which process comprises:

a. providing a continuous casting furnace and spaced therefrom, a cooling station;
b. supplying continuously to said furnace a continuous trough of a backing material;
c. supplying longitudinally of the internal base of said trough in said furnace continuous carbon fibers in the form of a tow, the fibers of said tow being supplied across the width of said trough;
d. supplying in said trough in said furnace, molten bearing metal at a temperature at which it wets said carbon fibers, whereby said carbon fibers are incorporated in said molten bearing metal;
e. passing said trough containing said molten bearing metal and incorporated carbon fibers from said furnace to said cooling station, during which passage the carbon fibers rise through said molten bearing metal to approach the surface of said molten bearing metal; and
f. cooling and solidifying said molten bearing metal in said cooling station to form the shell bearing product in the form of a continuous strip of bearing metal containing incorporated therein continuous carbon fibers concentrated near the surface of said bearing.

3. A process as claimed in claim 2, wherein the carbon fibres have been provided with an electroplated copper coating from 0.5 to 5.0 microns thick.

4. A process as claimed in claim 2, wherein the bearing metal is a lead/tin alloy containing from 30 to 70 $^w/o$ of lead and from 70 to 30 $^w/o$ of tin.

5. A process as claimed in claim 2, wherein the bearing metal is a tin-based alloy containing from 0.5 to 5.0 $^w/o$ of titanium vanadium or hafnium.

6. A process as claimed in claim 2, wherein the carbon fibres have been provided with a coating such that they are more readily wettable by the bearing metal.

7. A process for the continuous manufacture of carbon fiber reinforced shell bearings in which the bearing metal is a tin based alloy containing from 0.5 to 5.0 weight percent of titanium, vanadium or hafnium, which process comprises:
   a. providing a continuous casting furnace and a cooling station;
   b. supplying to said continuous casting furnace a continuous trough of backing material;
   c. supplying longitudinally in said continuous trough in said continuous casting furnace continuous carbon fibers in the form of a tow and said bearing metal in the molten form at a temperature at which said molten bearing metal wets the carbon fibers whereby the carbon fibers are incorporated into said molten bearing metal; and
   d. passing the trough containing molten bearing metal and said incorporated carbon fibers through the casting furnace to the cooling station and cooling and solidifying the bearing metal to form the shell bearing product in the form of a continuous strip.

8. A process as claimed in claim 7 wherein the carbon fibers have been provided with a coating such that they are more readily wettable by said bearing metal.

* * * * *